Patented Sept. 19, 1939

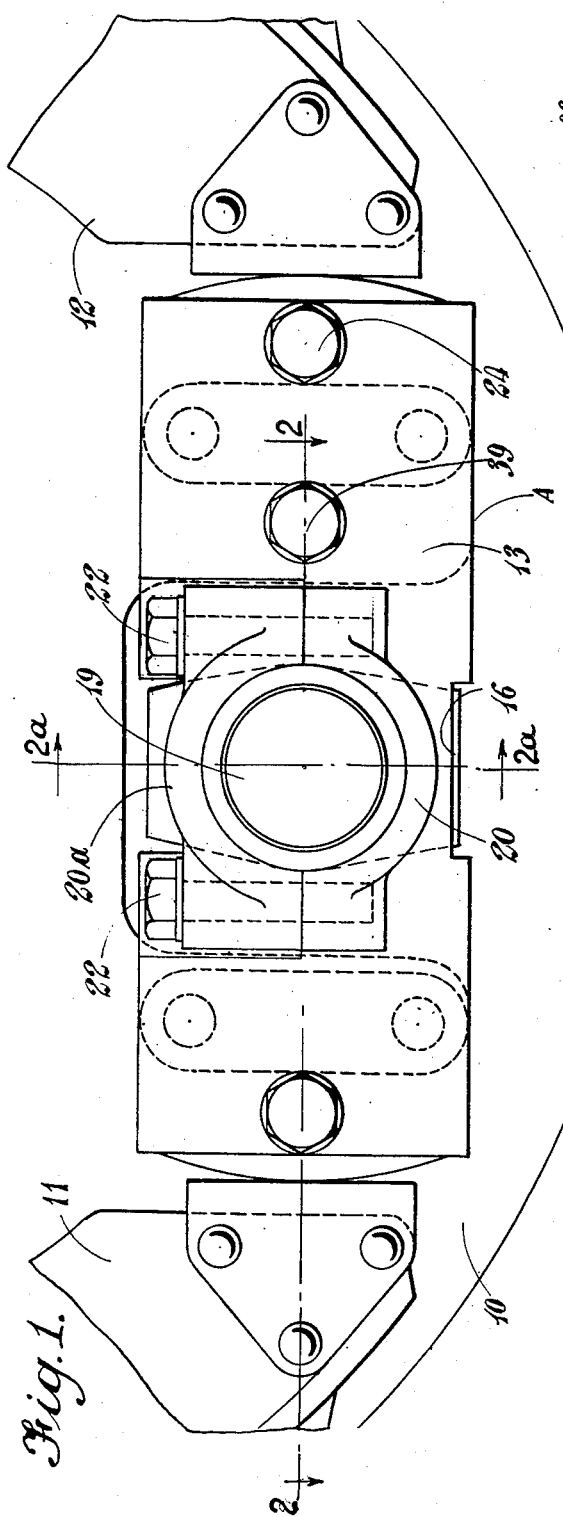

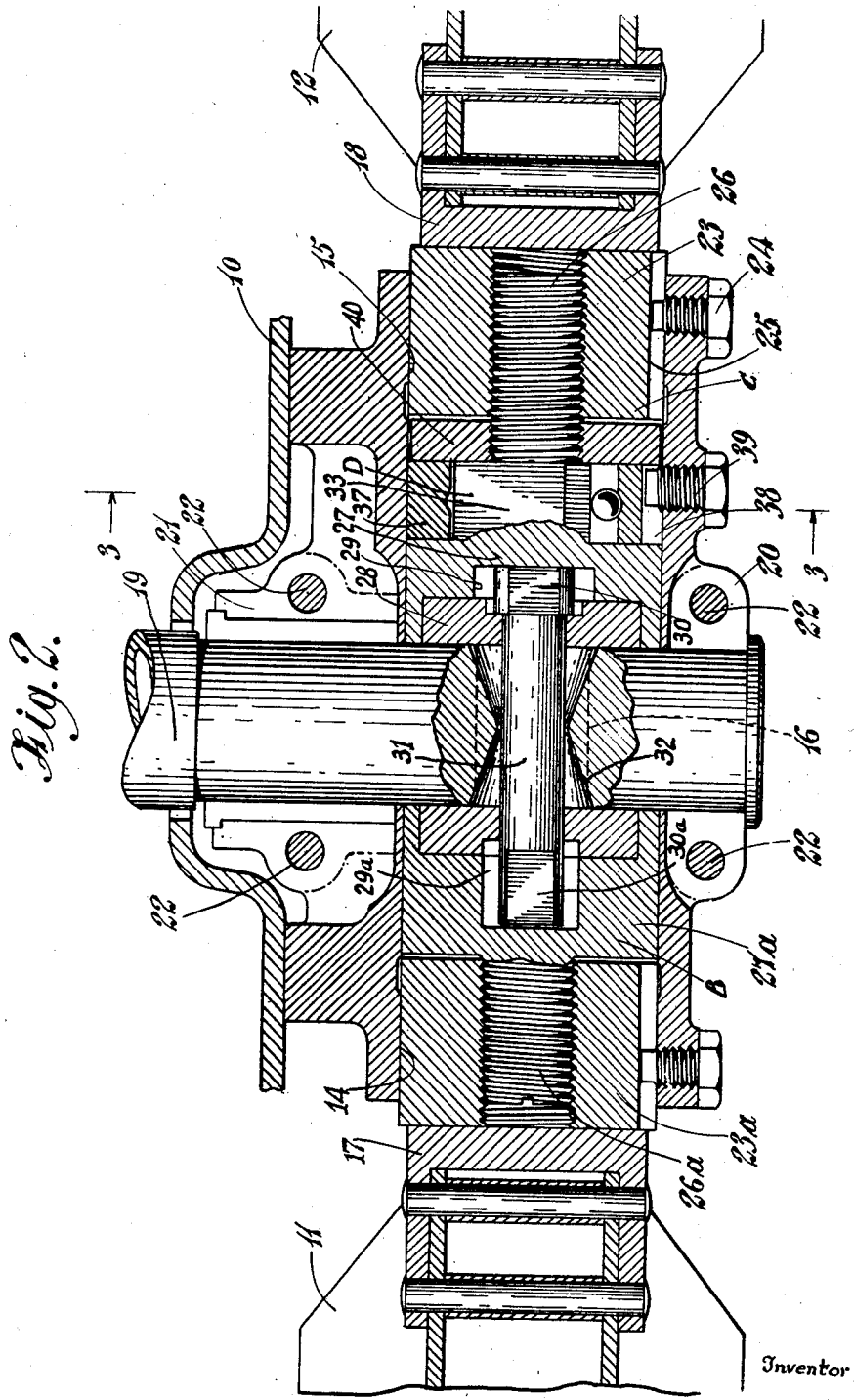

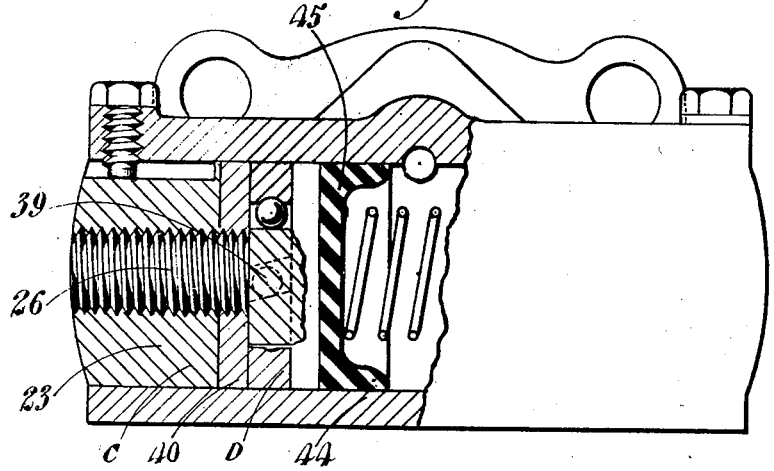
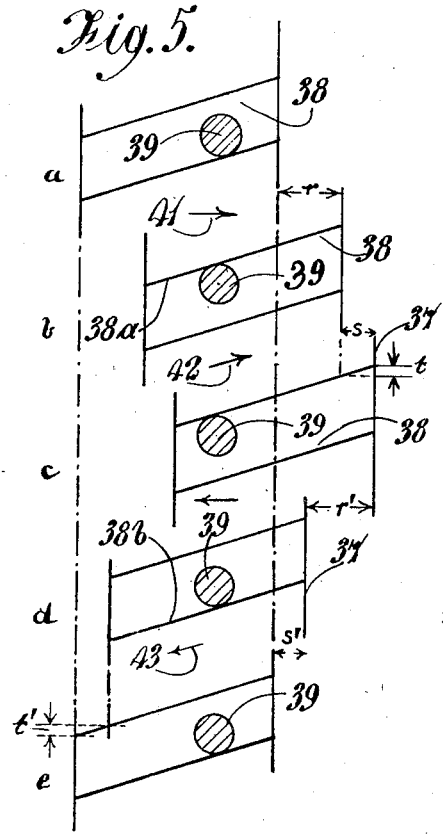
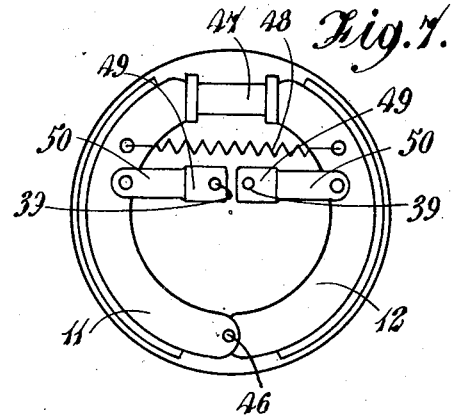
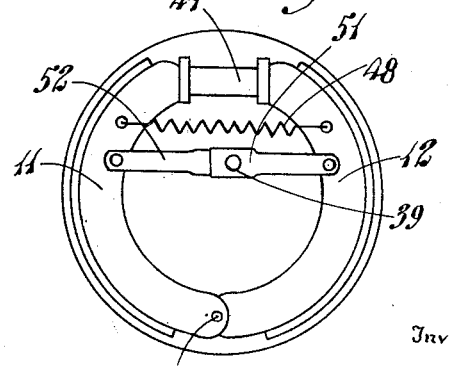

2,173,577

UNITED STATES PATENT OFFICE 2,173,577

AUTOMATIC ADJUSTING MEANS FOR BRAKES

Edward Claude Shakespeare Clench, Leamington Spa, England, assignor to Automotive Products Company Limited, London, England Application October 15, 1937, Serial No. 169,274
In Great Britain October 17, 1936

1 Claim. (Cl. 188—79.5)

The invention relates to brakes and more particularly to automatic adjusting means therefor intended to prevent excessive clearance, due to wear, between the friction means, such as a pair of brake shoes, and a brake drum cooperating therewith.

One object of the invention is to provide an automatic adjusting means adapted to be operated by substantially small increments of predetermined value in order that the adjustment of the brake shoes does not become upset by abnormal temporary conditions, such as by an excessive brake drum expansion caused by overheating or an excessive deformation of the brake drum as might occur if the brake was applied very heavily.

Another object of the invention is to provide an automatic adjusting means including a one-way drive cooperating with a two-part screw-threaded device which is adapted to be displaced in a direction parallel with the axis of the screw thread for normal applications of the brake, while as the clearance of the brake becomes excessive, a relative movement takes place between the two parts of the screw-threaded device to reduce the brake clearance by a predetermined value.

Another object of the invention is to provide an automatic adjusting means including a free wheel associated with a screw-threaded device.

Yet another object of the invention is to provide an automatic adjusting means including a movable screw-threaded device connected with a one-way drive, and means associated with said screw-threaded device and having an oblique slot cooperating with a fixed member to convert axial movement of the said screw-threaded device, in excess of that required for normal application of the brakes, into circular movement for displacing the two parts of the screw-threaded device one with respect to the other to reduce the brake clearance.

Other objects and features of the invention and other novel combinations of parts and desirable particular constructions will be apparent from the following description and from the accompanying drawings which show several embodiments of automatic adjusting means, and in which:

Figure 1 is an elevation of the applying means for a two-shoe drum brake embodying automatic adjusting means;

Figure 2 is a sectional plan on the line 2—2 of Figure 1;

Figure 2a is a partial section on the line 2a—2a of Figure 1;

Figure 3 is a fragmentary sectional elevation taken on the line 3—3 of Figure 2 showing the construction of the one-way frictional clutch;

Figure 4 is an underneath plan of the outer element of the one-way frictional clutch showing the oblique slot with the co-engaging pin in section;

Figure 5 is a diagram to illustrate the action of the pin and slot device shown in Figure 4;

Figure 6 is a part-sectional elevation of the improved adjusting means as applied to a hydraulic wheel cylinder unit; and Figures 7 and 8 are diagrams illustrating modified applications of the invention.

In the embodiment shown in Figures 1 to 4, a backing plate 10 cooperates with a pair of brake shoes 11 and 12, the free ends of which are arranged to be spread apart by an operating means which is indicated generally at A and is carried by the backing plate 10.

The combined operating and automatic adjusting means A comprises a casing 13 which is formed with a pair of coaxial bores 14 and 15. In said bores are slidably mounted plunger members B and C which are interposed between a substantially rectangular operating cam 16 and cap members 17, 18 provided respectively upon the ends of the brake shoes 11 and 12. The operating cam 16 is carried by an actuating shaft 19 so that as the latter is moved angularly the plunger members B and C are spread apart, thus applying the brake shoes 11 and 12 to the conventional drum (not shown). The shaft 19 is mounted in bearings 20 and 21, the lower parts of which are formed integrally with the casing 13, while the upper parts therof are formed by a removable bearing cap 20a. Bolts 22 serve to hold the bearing cap in position.

The plunger member C comprises a collar 23 which is prevented from rotating relative to the casing 13 by a screw 24 engaging a groove 25 in said collar, while the interior of the latter is screw-threaded for engagement with a stem 26 formed with a circular head 27. The end surface of this head is formed with a recess in which is located an insert 28 of hard material to cooperate with the cam 16. The head 27 is also formed with a groove 29 the sides of which engage flats upon the head 30 of a rod 31 serving to transmit rotational movement from the plunger member C to the plunger member B. It will be seen that the cam 16 is formed with a passage-way 32 which widens out at its two ends so as to allow the requisite angular movement of the shaft 19 and cam 16 for applying the brake. That part of the head 27 adjacent the screw-threaded stem 26 constitutes the inner element 33 of a one-way frictional clutch indicated at D, this element being approximately triangular, as will be seen from Figure 3, and being formed with oblique bores 34 in which are located springs 35 serving in each case to force a ball 36 into firm contact with the outer element of the clutch constituted by a ring 37. Thus in Figure 3 movement of the ring 37 in an anti-clockwise direction is imparted to the inner element 33 and thence to the screw-threaded stem 26, whereas movement in a clockwise direction causes the balls 36 to slip and the inner element 33 remains stationary.

For controlling the movement of the ring 37 the latter is formed with an oblique groove 38 which is shown particularly in Figure 4 and which is engaged by the cylindrical inner end of a screw or pin 39 secured to the casing 13. Axial movement of the ring 37 relative to the inner element 33 of the clutch is prevented by a circular nut 40 which is firmly secured upon the screw-threaded stem 26. Thus as the plunger member C as a whole is moved by the operating cam 16 during the application of the brake and returns under the action of the conventional return springs (not shown) when the brake is released, the ring 37 moves relative to the pin 39. The cylindrical inner end of the pin 39 is slightly smaller in diameter than the width of the groove 38, this difference being so calculated that when the lining of the brake shoe 12 has its prescribed clearance the movement of the plunger member C necessary to apply the shoe fully is equal to the play of the pin 39 within the groove 38 taken in a direction parallel with the axis of the plunger member C. Should the brake shoe clearance be excessive, however, such as due to lining wear, the movement of the plunger member C necessary to apply the brake will also be greater than the normal, and after the play between the pin 39 and the groove 38 has been taken up the ring 37 will be caused to rotate slightly in a direction which is downwards in Figure 4 and clockwise in Figure 3. This movement is not transmitted to the inner element 33 of the one-way clutch but when the brake is released a corresponding rotational movement of the ring 37 takes place in the opposite direction, since the return movement of the plunger member C is also greater than the play between the pin 39 and the groove 38. This angular return movement of the ring 37 is transmitted by the balls 36 to the screw-threaded stem 26 and since the collar 23 is held against rotation it becomes unscrewed slightly from said stem, thus advancing the brake shoe 12 by a small distance. The obliquity of the groove 38 is so arranged in conjunction with the pitch of the screw-thread upon the stem 26 that a very small proportion, say one three-hundredth part, of the excessive clearance is taken up at each brake application. In this way the adjustment of the brake shoes does not become upset by abnormal conditions which are likely to occur temporarily, such for example as an excessive expansion of the brake drum due to overheating or an excessive deformation of the brake drum as might occur if the brake was applied extra heavily.

The action of the pin 39 in the groove 38 will be clear from the diagram of Figure 5 which shows the stages in the the movement of the groove 38 relative to the stationary pin 39 during the application and release of the brake when the lining clearance is excessive. The proportions of the parts and their movements are exaggerated in Figure 5 in order that they may be shown more clearly. The "off" position of the groove 38 is shown at $a$ and this of course is dependent upon the cam 16 which in effect constitutes the final stop for the brake shoe 12. During the first part of the brake-applying movement, i. e. that which would be necessary if the brake shoe had only the prescribed clearance, the groove 38 moves to the position $b$, the extent of this travel being $r$ and the direction being indicated by the arrow 41. As in the present example the shoe clearance is excessive, further applying movement is required to take the groove 38 to the position $c$ but as the pin 39 was just in engagement with the edge 38$a$ of the groove in the position $b$ this further movement indicated at $s$ must necessarily take place in the direction of the arrow 42, thus rotating the ring 37 by an amount indicated by $t$. This rotation is not transmitted to the screw-threaded stem 26 owing to the presence of the one-way clutch D. When the brake is released the play between the pin 39 and the groove 38 enables the ring 37 to move back to the position indicated at $d$ and by an amount $r'$ which is equal to $r$. During further releasing movement, however, the pin 39 is in engagement with the surface 38$b$ of the groove and therefore the ring 37 is constrained to move in the direction of the arrow 43, thus rotating by an amount $t'$ to the position $e$. The rotational movement $t'$ is imparted through the clutch D to the stem 26 as previously explained and advances the shoe 12 to a slight extent, so correspondingly reducing the travel of the shoe which will be necessary the next time the brake is applied.

For the purpose of adjusting simultaneously the clearance of the brake shoe 11, the plunger member B comprises a collar 23$a$ which is progressively fed forward by a screw-threaded stem 26$a$, the latter being rotated in unison with the stem 26 through the medium of the rod 31 which latter is flattened at 30$a$ for engagement with a groove 29$a$ in the head 27$a$ of the stem 26$a$. The thread of the latter is necessarily of opposite hand to the thread on the stem 26 and if desired the pitch can also be different so as to compensate for differing rates of lining wear upon the respective brake shoes 11 and 12.

The improved automatic adjusting means according to the invention can be used in many other ways and examples of these are shown in Figures 6, 7 and 8. In Figure 6 it is incorporated in a hydraulic wheel cylinder unit, the general construction being substantially the same as before. The cylinder 44 contains a plunger member C incorporating a one-way clutch D and constitutes a sliding piston having a sealing cup 45 in the continental manner. As before the brake shoe bears against the outer end of the collar 23 which latter is fed forward as adjustment is required by means of a screw-threaded stem 26, while the inward movement of the plunger member C is limited by the engagement of the pin 39 with the adjacent surface of the nut 40. If desired one or both of the pistons within the cylinder 44 can be fitted with the improved adjusting means.

In the arrangement shown in Figure 7 the brake shoes 11 and 12 are pivoted at 46 and are brought into engagement with the conventional brake drum (not shown) by any ordinary operating means such as a hydraulic wheel cylinder indicated at 47. In order to limit the retracting movement under the action of a return spring 48 and thus to regulate the "off" clearance of the linings, two stop devices are provided. The outer casings 49 of these correspond to the casing 13 in the previous example and are fitted with pins 39 as before. Plunger members 50 corresponding in construction to the plunger member C are slidably mounted within the fixed parts 49 and are attached to the brake shoes 11 and 12. If, therefore, the applying movement of either of said shoes exceeds the prescribed normal distance, the retracting movement of the said shoes brings about a readjustment of the corresponding stop devices 49, 50 so as to reduce said excess by a small amount. A somewhat similar arrangement is indicated in Figure 8 where the outer casing 51 of an adjustable stop device is secured to the brake shoe 12, while the plunger member indicated at 52 is similarly attached to the shoe 11. In this case it is the total brake applying movement and not the individual clearance of the shoes which is automatically adjusted to the prescribed value.

What I claim is:

A brake adjustment comprising a threaded stem, a collar screwed thereon serving to adjust the position of the friction means, a one-way frictional clutch coaxial with the stem and collar and having one element connected to said screw-threaded stem and another element formed with an oblique groove, a fixed member projecting into said groove and which is out of operative contact with a cam surface formed by said oblique groove during normal applications of the brake, and which engages said cam surface and causes a relative movement between said stem and collar as the clearance between the friction means and the brake drum exceeds a predetermined value.

EDWARD CLAUDE SHAKESPEARE
CLENCH.